(12) United States Patent
Alvord et al.

(10) Patent No.: US 11,888,317 B2
(45) Date of Patent: Jan. 30, 2024

(54) STATISTICAL PROCESS CONTROL METHOD OF DEMAND SIDE MANAGEMENT

(71) Applicants: Robert John Alvord, Elmwood Park, IL (US); Yoshio Wynn Kano, Barrington, IL (US)

(72) Inventors: Robert John Alvord, Elmwood Park, IL (US); Yoshio Wynn Kano, Barrington, IL (US)

(*) Notice: Subject to any disclaimer, the term of this patent is extended or adjusted under 35 U.S.C. 154(b) by 244 days.

(21) Appl. No.: 17/230,673

(22) Filed: Apr. 14, 2021

(65) Prior Publication Data

US 2022/0337062 A1    Oct. 20, 2022

(51) Int. Cl.
*H02J 3/00* (2006.01)
*G06Q 10/04* (2023.01)
*G06Q 10/0631* (2023.01)
*G06Q 50/06* (2012.01)

(52) U.S. Cl.
CPC ........... *H02J 3/0075* (2020.01); *G06Q 10/04* (2013.01); *G06Q 10/06312* (2013.01); *G06Q 10/06315* (2013.01); *G06Q 50/06* (2013.01); *H02J 3/003* (2020.01); *H02J 3/004* (2020.01)

(58) Field of Classification Search
CPC .......... H02J 3/0075; H02J 3/003; H02J 3/004; H02J 2203/20; G06Q 10/04; G06Q 10/06312; G06Q 10/06315; G06Q 50/06
See application file for complete search history.

(56) References Cited

U.S. PATENT DOCUMENTS

| | | | | |
|---|---|---|---|---|
| 2012/0259583 | A1* | 10/2012 | Noboa | H02J 13/00016 702/179 |
| 2013/0096983 | A1* | 4/2013 | Forbes | G06Q 10/04 705/7.31 |
| 2015/0120223 | A1* | 4/2015 | Dannecker | G06Q 50/06 702/61 |
| 2015/0278968 | A1* | 10/2015 | Steven | G06Q 50/06 705/7.35 |
| 2017/0256948 | A1* | 9/2017 | Froehner | H02J 3/381 |
| 2018/0128862 | A1* | 5/2018 | Satoh | G06Q 10/06 |
| 2019/0190266 | A1* | 6/2019 | Soulieres | H02J 3/241 |

OTHER PUBLICATIONS

S. M. Blair, C. D. Booth, G. Williamson, A. Poralis and V. Turnham, "Automatically Detecting and Correcting Errors in Power Quality Monitoring Data," in IEEE Transactions on Power Delivery, vol. 32, No. 2, pp. 1005-1013, Apr. 2017, doi: 10.1109/TPWRD.2016.2602306. (Year: 2017).*

* cited by examiner

Primary Examiner — Mohammad Ali
Assistant Examiner — Dhruvkumar Patel
(74) Attorney, Agent, or Firm — Brie A. Crawford; Crawford Intellectual Property Law LLC

(57) ABSTRACT

A method of Demand Side Management is intended to manage the increasingly chaotic nature of the power grid, and is designed to adapt to the future impact to the grid patterns caused by the ongoing introduction of renewable power generation sources, battery charging associated with the increasing number of electric vehicles, and future unforeseen developments, by utilizing Statistical Process Control (SPC) techniques. SPC monitors the quality of the grid by treating the grid as if the grid was a process with varying levels of quality, to which the method can detect, anticipate and respond by making immediate and adaptive future scheduling decisions for the control of device loads, (Continued)

or generation, for the benefit of consumers as well as power companies.

9 Claims, 19 Drawing Sheets

STATISTICAL PROCESS CONTROL METHOD OF DEMAND SIDE MANAGEMENT

REFERENCES CITED

| Citing Patent | Filing date | Publication date | Applicant | Title |
|---|---|---|---|---|
| U.S. Pat. No. 7,110,832 B2 | Oct. 23, 2002 | Sep. 19, 2006 | Ghent | Energy Management System for an Appliance |
| U.S. Pat. No. 4,317,049 | Sep. 17, 1979 | Feb. 23, 1982 | Schweppe | Frequency Adaptive Power-Energy Re-scheduler |
| U.S. Pat. No. 7,010,363 | Jun. 13, 2003 | Mar. 7, 2006 | Donnelly | Electrical Appliance Energy Consumption control methods and electrical energy consumption systems |
| U.S. Pat. No. 7,110,832 B2 | Dec. 12, 2005 | Oct. 23, 2002 | Donnelly | Electrical Appliance Energy Consumption control methods anc electrical energy consumption systems |
| U.S. Pat. No. 8,406,937 B2 | Mar. 27, 2008 | Mar. 26, 2013 | Verfuerth et al. | System and Method for Reducing Peak and Off-Peak Electricity Demand by Monitoring, controlling and Metering High Intensity Florescent Lighting in a Facility |
| US 2011/0095017 A1 | Apr. 28, 2011 | | Brian M. Steurer, | System for Reduced Peak Power Consumption by a Cooking Appliance |
| US 2009/0063257 A1 | Aug. 29, 2008 | | Robert Edwin Zak | Automatic Peak Demand Controller |

BACKGROUND OF THE INVENTION

In 1982 Schweppe (U.S. Pat. No. 4,317,049) identified rescheduling loads by tracking the AC grid frequency changes. At the time of said prior art, generation and loading was more consistent than today, over a 24-hour period. The majority of the generation and the loads were spinning motors, resulting in a simpler relationship between frequency and load. Since 1982 the load cycles have become much more dynamic, and the frequency response smaller. Today the generation and loads are less likely to be motors. Maximum to minimum summer loads can be almost 2 to 1 day to night. Contributing causes of this load imbalance are higher air-conditioning loads during the day, and the ongoing replacement of incandescent lighting, with LED lighting, which is contributing to considerably less power consumption during the night.

The frequency change with load has been reduced due to more inverter motor loads and the use of switch mode power supplies, versus older transformer-based supplies. Another change to generation methods are renewables, for example photo voltaic (heretofore referred to as PV) generation. No spinning motors are involved. More significant is the need to switch between PV and traditional fuel generation, every day at sun rise and sun set. California ISO has days nearing 50% PV. Traditional generation needs to quickly ramp up at sunset and then ramp down at sun rise. The effect is increasing yearly and the resting generation curve is known as the "duck curve" (FIG. 19). As more renewables come online said effects will increase. The grid is becoming more chaotic so that simple frequency, or voltage monitoring methods of prior art Demand Side management methods (heretofore referred to as DSM) are no longer effective.

The projected peak load periods identified in proposals by "AHAM" and "Energy star" will no longer be true in the future. Said proposals requiring devices to connect to the internet are not only complex, but are meeting resistance from a society concerned about user data security. Future changes to the grid may not be easily accommodated by prior art methods. Some significant changes predicted are renewable generation, the electrification of transportation and widespread use of electric cars. Battery charging may increase nighttime loading. The seasonal patterns may change in unpredictable ways.

The use of AC line frequency alone, to determine the condition of the grid, is made difficult by said factors. On any given day there may not be a clear pattern. Data over the last few years shows an increasingly chaotic daily pattern. Sampling and averaging over a few days can bring out a pattern, but in the future, an increasingly larger sample may be required.

AC line voltage can be used to determine the condition of the grid, but has many of the same issues as noted for line frequency. In addition, voltage is affected by local loads and generators, more so than frequency. A local load inside a building can cause changes in voltage due to wiring resistance. A load sharing the same lines will see an apparent voltage variation due to the other devices turning on, or off. Local generation, such as home solar, photo voltaic (PV) feeding the grid, will also vary the apparent voltage. The local line voltage will change independently of actual grid conditions. For example, a home may have a refrigerator and an air conditioner on the same circuit which will cause a variation of the line voltage due to resistance in the wiring. Said variations modulate the line voltage independently from the actual grid. Making it difficult to determine the actual grid status.

Another issue with AC voltage is that significant distortion to waveforms can make determination of voltage difficult. A simple peak voltage reading is not accurate because most of the power supplies in consumer electronic devices use a capacitive input power supply. This tends to concentrate current at voltage peaks and the wiring resistance flattens the voltage at the peak making the peak voltage look lower than the supplied grid. AC motors can cause harmonic distortions that can raise the apparent peak voltage. Said distortions may require more filtering and processing to avoid faults in readings and require more complexity in controller hardware and processing. Instead a simple peak voltage an RMS calculation is needed. Power lines susceptible to cross talk, both inside the building, and out to the local transformer and then to the local distribution network.

One area where monitoring of AC line voltage is advantageous is in larger devices with dedicated feeds. Said devices see a voltage closer to the actual grid since it a dedicated feed is usually required. For instance, spas, pools, and car chargers require a dedicated feed, independent of other loads in a residence or building. Some larger area loading of AC grid distribution is still possible, but effects are lower. Said local effect can be used as an advantage, both for sensing local transmission line problems and in emergency situations that can be localized before larger areas are affected. The techniques discussed for line frequency can also be used for line voltage, with consideration for the local effects.

Individual device usage patterns can also be characterized to make better decisions about when to schedule and modify operating parameters. Device usage tracking is discussed by Lacey in prior art patent (9032751) where tracking was done in a refrigerator. Tracking of other devices with regular usage patterns are also possible. Tracking techniques are used to look for weekly variation patterns. A weekly cycle is used to predict and modify demand and combined with AC grid predictions, make an autonomous DSM system that will be flexible and adapt to future changes and also can run autonomously solving security concerns that IOT (Internet of Things) and connected devices present. The processing power available to most microcontroller-based devices is enough to make said tracking and control approaches possible and desirable.

Determining device usage patterns are specific to each device. Typically, there will be a percentage on time, or duty cycle, on higher energy components in a device. For example, Refrigeration controls will need to track compressor, defrost and ice making run times and off times. Other devices will have similar operational signatures. Pools will have run and heating times. Cooking devices will have heating times and no heating times. Devices that are run by micro controllers will be capable of characterizing the operation of the device over time. This is not limited to consumption devices but also local generation devices such as PV, wind, hydroelectric, et al.

Each device has a set of known operating characteristics that can be tracked. Said characteristics can be determined in the design of the control system and optimized for use with the present invention for the benefit of lower operating costs for the consumer and increased stability for the grid.

Devices can also have a weekly period with weekend activity differing from weekdays. 7 days of data would be necessary to identify the weekend days for devices that would benefit from differing weekday and week-end schedules.

BRIEF SUMMARY OF THE INVENTION

"Demand Side Management", heretofore referred to as DSM, is used to refer to a group of actions designed to manage the energy consumption of the electric power grid, heretofore referred to as the "grid" with the purpose of reducing the costs incurred by the grid, as well as the consumer, by managing the energy demand of electric appliances that use power from the grid. Said management can take on many forms, but most commonly takes the form of a control box mounted to an appliance, which is able to turn off the appliance during peak demand periods, as they occur. Conversely, the present invention takes on the form of a feature of a devices' existing electronic control that anticipates peaks and proactively reschedules loads to avoid peaks when possible, rather than waiting until a peak occurs before reactively responding.

"Statistical Process Control", heretofore referred to as SPC, is the method of measuring and controlling the quality of a product, by monitoring the manufacturing process. Quality data is collected in the form of product and process measurements and readings from various machines and instrumentation. Said data is collected and used to evaluate, monitor, and control the process. SPC is an effective method to drive continuous quality improvement by monitoring and controlling the process. The SPC controlled process operates efficiently and effectively produces quality products. The present invention is a method of DSM that is intended to manage the increasingly chaotic nature of the power grid, and is designed to adapt to the future impact to the grid patterns caused by the ongoing introduction of renewable power generation sources, battery charging associated with the operation of an increasing number of electric vehicles, and future unforeseen developments, by utilizing SPC techniques. SPC is typically a method for controlling manufacturing process variation in a factory, analogously the present invention adapts SPC methods to help monitor the quality of the grid by treating said grid as if said grid were a process with varying levels of quality, to which the present invention can detect, anticipate and respond by making immediate and adaptive future scheduling decisions for the control of device loads, or generation, for the benefit of the consumer as well as the power companies.

The present invention is the DSM method of sensing the status of the grid by monitoring and tracking the voltage and/or frequency of said grid, storing data over time, to utilize SPC techniques to make adaptive future scheduling decisions for loads or generation. The present invention will also use real time monitoring to adjust operational decisions. The present invention will also monitor the grid for critical stress events and enable drastic load reduction. Said invention can be applied to any device with an existing, or added micro controller, or equivalent. The present invention is not dependent on external communication. The present invention Looks at the grid as a process and machine over time in differing time frames, using frequency and or voltage measurement as the variables to make predictions with statistical process control methods.

DETAILED DESCRIPTION

Figure 1:
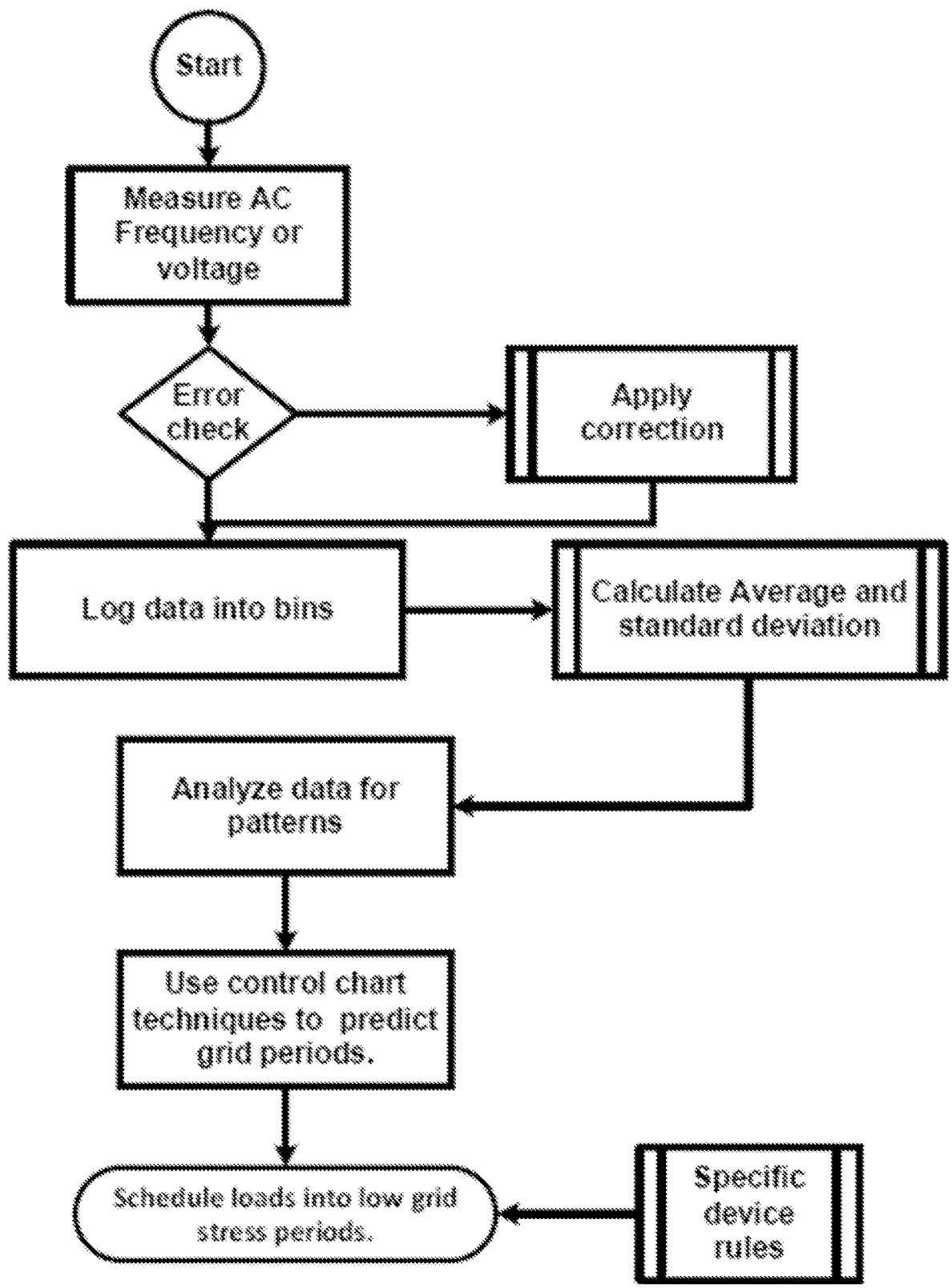
FIG. 1: Is a flow chart of the daily tracking into bins to be used for predictive scheduling of future loading.

While this invention is susceptible to embodiment in many different forms, there are shown in the drawings and will be described herein in detail, specific embodiments Thereof, with the understanding that the present disclosure is to be considered as an exemplification of the principles of the invention and is not intended to limit the invention to the specific embodiments illustrated.

The present invention is the DSM method of sensing the status of the grid by monitoring and tracking the voltage and/or frequency of said grid, storing data over time, to utilize SPC techniques to make adaptive future scheduling decisions for loads or generation. The present invention will also use real time monitoring to adjust operational decisions and will also monitor the grid for critical stress events and enable drastic load reduction when deemed necessary. Said invention can be applied to any device with an existing, or added micro controller, or equivalent. Said invention is not dependent on external communication to make operational decisions, instead regards the appliance and the grid as a machine process, using frequency and, or voltage, over time, as the variables to make operational decisions and predictions utilizing SPC methods.

A plurality of data bins and a data matrix are used to track and decipher patterns as shown in FIG. 1. Said bins can be of any length, but in this exemplification, 32 bins per 24 hours, or 45 minutes for each bin, are used. The line frequency (and/or voltage) average is calculated for each bin and logged. Many methods can be used to determine the average, but in this exemplification the method is to count zero crosses over the entire bin and log the count. Said count will be an inverse of the frequency. Said frequency value and running averages are logged for a given number of days. Said averaging is necessary to account for occasional aberrant values that are not representative of the actual grid operation. Said Averaging can be done by keeping a matrix of the daily counts over many days, for instance, 16 days, in general, longer is better, however too long would not allow algorithm to move between the changing seasonal patterns. The transition of summer to fall and winter and spring grid profiles are different. Presently, the peak load for summer is in the afternoon, while winter has morning and evening peak load periods, but grid conditions are changing rapidly. Presently the grid in the western United States is seeing the effects of an increasing number of solar power farms coming on line, which only generate electricity during daylight hours and then quickly drop off at sunset, requiring traditional power generation to come on line quickly and take over, creating the so-called "duck curve" when looking at the power production demand chart. Solar power is pushing the summer afternoon peak into an evening stress peak. Stress is monitored for the combination of load and generation effects. In choosing bin size the limitation of the particular device and processing power as well as storage must be considered. Since bins are circular in a 24-hour day no real time clock is needed.

The accuracy of the micro controller time base is a consideration. Even the simplest RC timer bases are now over 98% accurate. Enough accuracy for simplest devices, such as a refrigerator. Accuracy needs to be over many days, for instance 15 days. Longer term time drift is taken up by the overall binning averages which move with time and do not need to be synchronous with the actual time of day. Critical applications can use more accurate time base if required.

Since the grid does experience occasional short line dropouts, which could cause errors in bin averages, error detection and correction is necessary. Short line dropouts, or voltage sags, would trigger an algorithm to fill in the blank time. Most dropouts are seconds, so the devices power supply will need enough hold up time to keep the controller running until the data is saved, or the power restored. Longer dropout times would trigger an algorithm to disregard that bin, in time frame effected. Another option is an algorithm to fill in the lost bin with the current average, thus simplifying the overall analysis with little loss of information. More critical devices can include a power supply with a longer hold up time. With some level of error detection, nearly all power disruptions can be handled.

Each Bin of 45 minutes is averaged and the standard deviation calculated. The total time covered by all bins in the matrix are averaged. Alternate methods can be used in smaller devices with less processing power, such as calculating the running average minimum and maximum values and estimating the standard deviation. Said methods are scalable to meet the needs of each device. Any given bin has an average near, above, or below the total average result which would look something like FIG. 4, which is a 15-day period captured during the summer, compared to FIG. 5, which is a wintertime sample. Patterns are generally not simple morning, or afternoon peaks, but instead an irregular pattern reflecting the effects of load and generation switching. Load is somewhat sinusoidal with a summer afternoon peak and morning and evening wintertime peaks. Generation generally ramps up ahead of the anticipated load increase and ramps down after as larger generators shut down. Since Generation is scheduled ahead of time, it is not in full sync with load, to avoid shortages. This creates peaks, or valleys, in frequency and voltage during ramping periods. The introduction of renewable energy sources increases the amount of variation during the day light hours due to the inherent variability due to weather and inexact forecasts.

Figure 4:
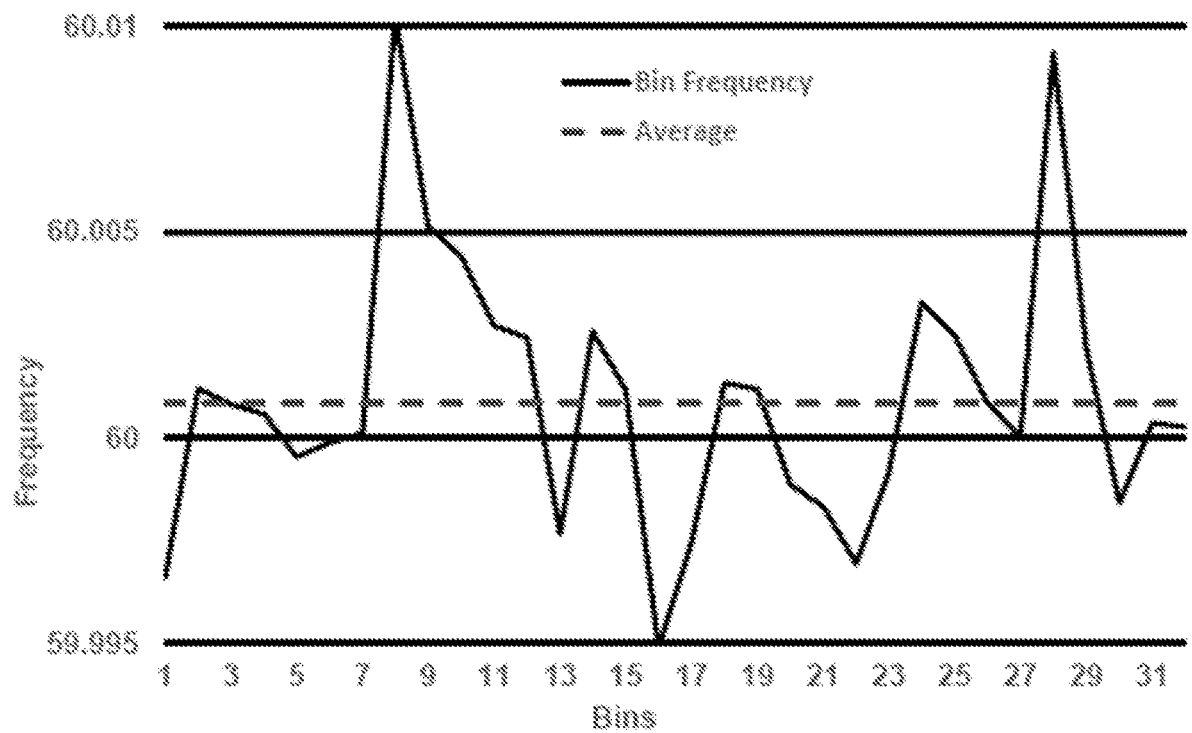
FIG. 4: Shows a 15-day AC frequency average of 45-minute bins over 24 hours. This in a Summertime period starting at midnight. AC line frequency on the vertical scale, and the 45-minute bins shown on the horizontal scale.
Figure 5:
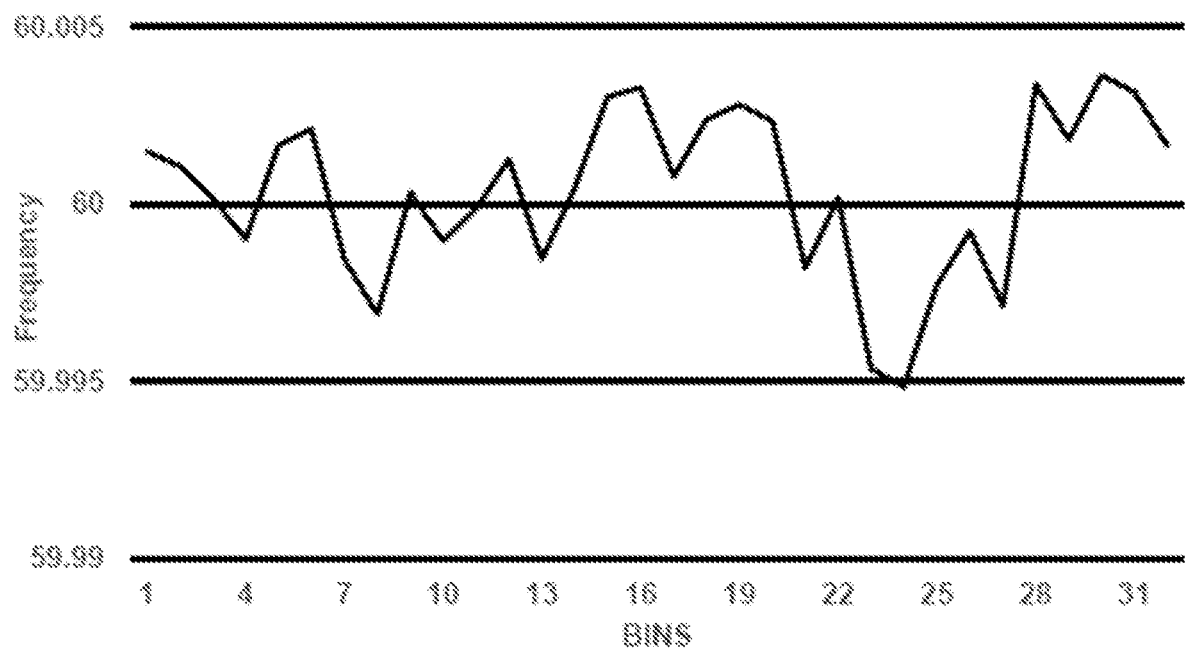
FIG. 5: Shows similar data as in FIG. 4 but for wintertime.

Even with averaging over many days, it is still difficult to predict when best to schedule loads, as shown in FIGS. 4 and 5.

Figure 6:
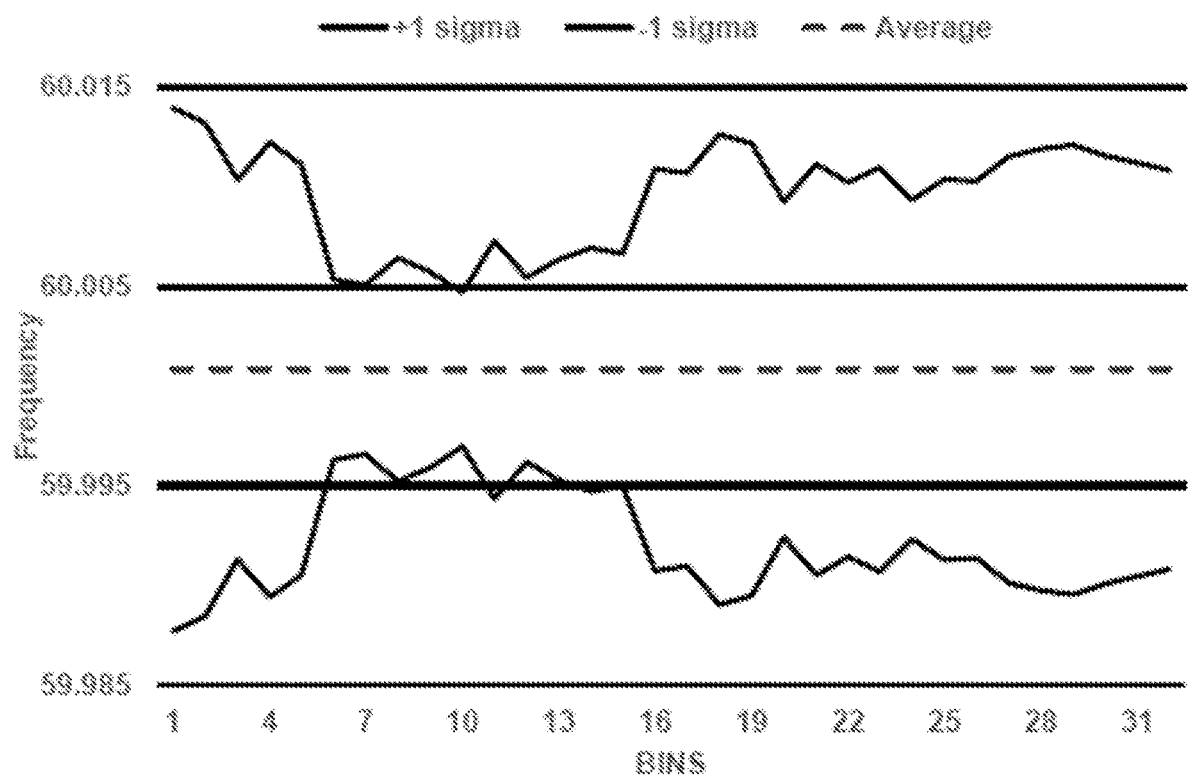
FIG. 6: Shows plus and minus one Standard deviation as calculated for each bin for the same 15-day period as in FIG. 4. Dashed line is average and two irregular solid lines are plus and minus one standard deviation.
Figure 7:
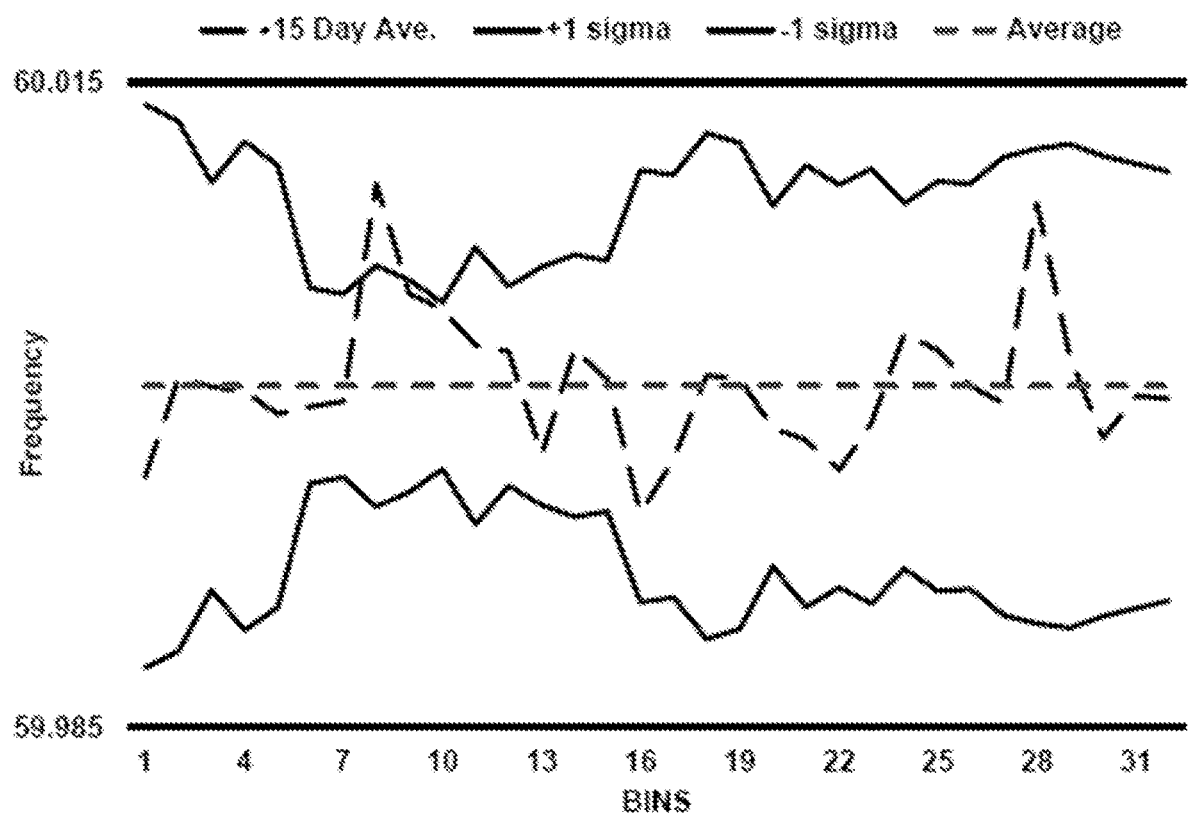
FIG. 7: Shows average from FIG. 4 and standard deviation from FIG. 6.

The present invention regards the grid as a machine and uses SPC and control chart techniques to monitor the variation over a daily pattern. The standard deviation is calculated for the captured frequency data in each bin. Using the same data as presented in FIG. 4, standard deviation is calculated for each bin as shown in FIG. 6. FIG. 6 shows +1 and −1 sigma (one standard deviation) around the long-term average. A modified control chart is used to predict grid stress resulting from both load and generation. FIG. 7, shows both bin frequency and bin standard deviation (Chart is corrected to start at midnight with bin 1, but in practice bin 1 could be any of the 32 bins). The period from early morning to near noon is the low stress period with lowest deviation, or daily variation of line frequency. Said period also has the highest average frequency period, except for bin 28 (peak late in day FIG. 4), which is also high. Bin 28, while higher in frequency, also has a high deviation. This makes bin 28 less desirable to schedule loads than if we look at frequency alone. The variability of bin 28 is possibly due to the ramp down of loads that are moving quickly with the variation and ramp down of generation, which is lagging to avoid shortages.

Figure 8:
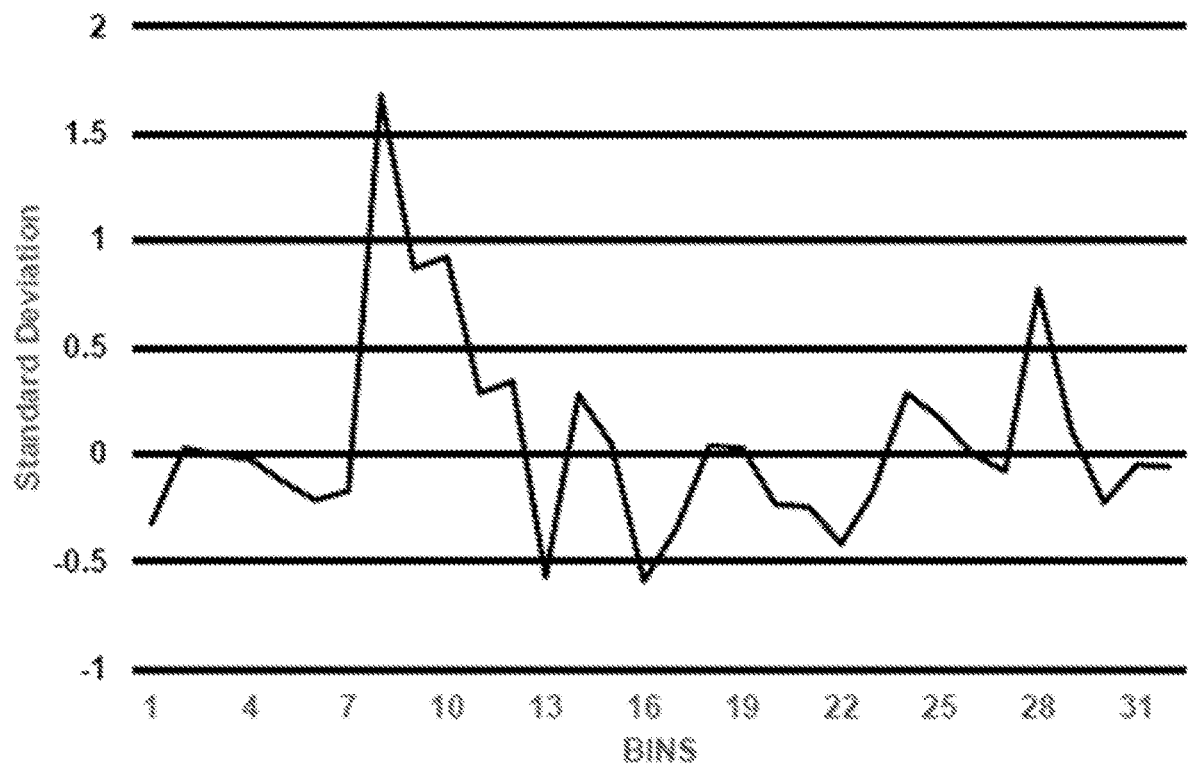
FIG. 8: Converts data from FIG. 7 to control chart format. Sigma's are shown on the vertical scale (standard deviations from each bin) over a 15-day period on the horizontal scale.

FIG. 8 is a control chart created from the sigma calculations of each bin. This is done using the long-term average, each bins average, and each bins standard deviation. Since the vertical axis is on the same scale as in FIG. 7, the deviation can be plotted in a control chart fashion. The FIG. 8 chart now considers both frequency average and variability of the bins and takes on a more sinusoidal look. The FIG. 8 sigma values are now easily understood numbers and can now be compared, analyzed, and then used to make decisions about when to schedule loads and when to avoid scheduling loads. In FIG. 8, early morning to mid-morning are all positive values and as high as 1.6 sigma. Said positive values tend to occur during low grid stress periods, while a string of low and negative sigma values occur from mid-morning to early evening, occur during higher grid stress periods where operating loads are to be avoided. Said values can be collected, compiled and used make predictions about future grid stress and use that information to schedule loads and offsets in devices.

Control chart rules such as "Shewhart control chart rules" (Shewhart, W. A. (1939). *Statistical Method from the Viewpoint of Quality Control*) can be used to make detailed decisions. For instance, look at the oscillating bins as seen in mid-day in FIG. 8 and avoid that period. Smaller bins would be helpful to make decisions and allow finer control.

The control chart rules can be setup so that periods of higher than average frequency are considered better times to operate loads than periods of lower than average frequency, and use said rules to make decisions of when to schedule high load usages within known low load demands of the grid. For example, home refrigeration defrost typically happens about once a day during the summer. The present invention has the ability to look forward and predict the best low usage time (bin) to run the next defrost cycle. In this exemplification, the control makes the determination to pick early morning to run the next defrost cycle. Other devices might run large loads over a few days, or more than once a day. The control can anticipate the best time (or bin) to run the loads by using grid data and load data. The designers of each particular device can scale these techniques to meet the requirements of the application using known operating behaviors.

Although said higher frequency periods are better for scheduling loads, this is not true for generation, which is best centered on the line frequency. This also applies to local renewable generation such as wind and solar installations which are becoming more prevalent, and can be a disruptive force if allowed to feed the grid during a period of high traditional generation, or during ramp up and ramp down periods. Conversely the grid can benefit from local renewable generation if controlled by the present invention, which is programmed to help balance some of the ramp up and down problems and can be scheduled to feed the grid during low frequency, or low voltage periods.

Described below is one possible exemplification of a two step approach to device load mitigation. Device loads can be scheduled to avoid lower frequency periods with the understanding that 100% forecast accuracy cannot be expected due to daily variability. In addition to scheduling loads to avoid said high demand periods, devices with larger loads will also need to monitor grid stress in real time to make operational and load use decisions. It may be necessary to immediately and aggressively reduce loads if, for example a brown out were to occur (see FIG. 2). Devices with larger loads and less tolerance for operational changes, need an accurate method of real time measurement. Devices with smaller loads and tolerant of operational changes, can use a simple, less accurate real time measurement method. Analysis of the preceding minutes, or seconds, can be used to make final operational decisions and judge real-time grid stress. Many grid connected devices automatically turn on and off loads and even the simplest devices can monitor and assess the grid condition before turning on. Complex devices with large loads can assess the real time grid condition to determine if it is advantageous to turn on, or off loads immediately, or reschedule.

Figure 2:
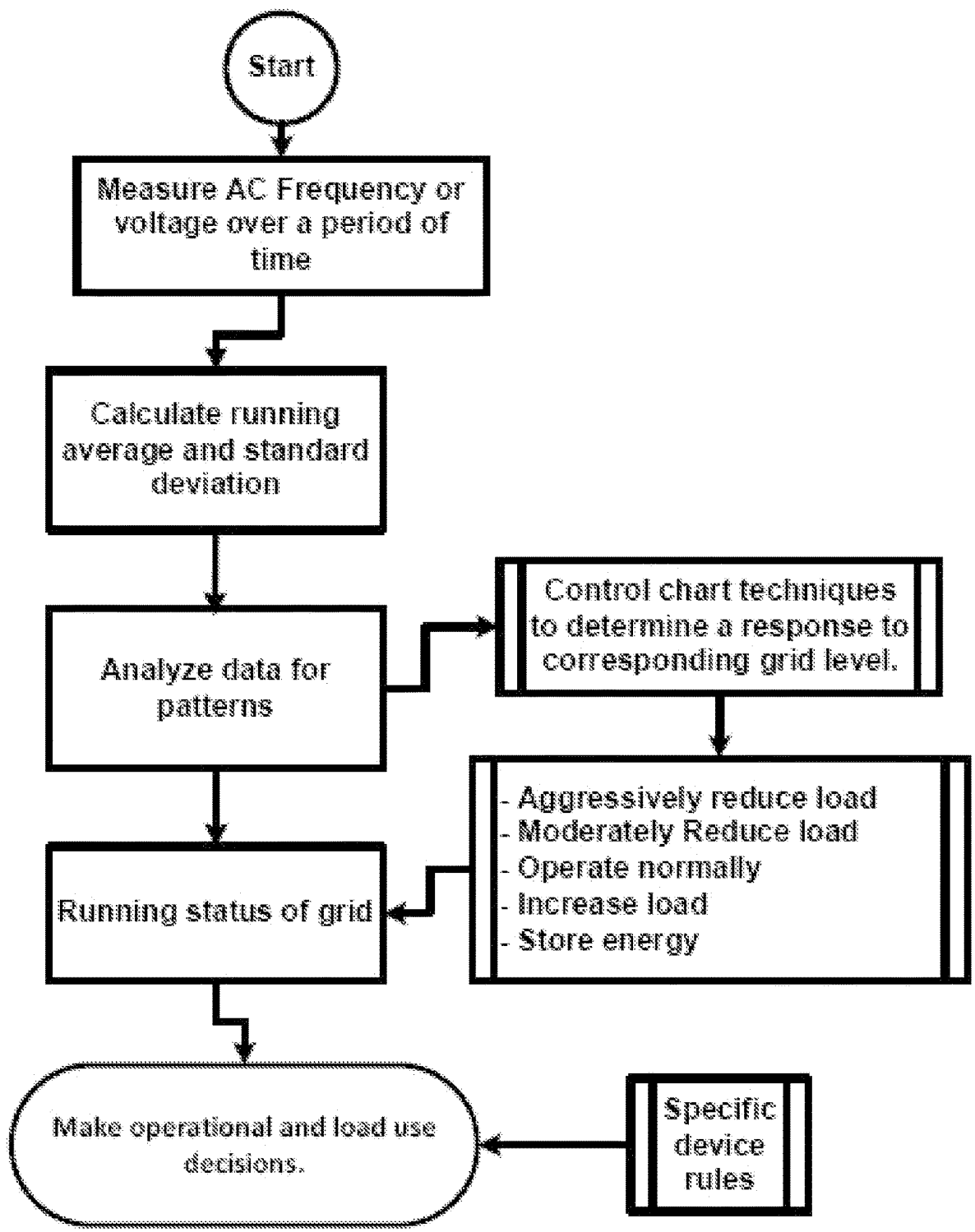
FIG. 2: Is a flow chart of medium-term tracking to use for real time load decisions as they happen.

The grid frequency and/or voltage data is monitored for a given period of time and used to calculate the average and standard deviation, See FIG. 2. Said calculations can be stored as a matrix of data, or a running average, depending on the accuracy required by the device, and used to develop an out of control specification and reaction plan. For this exemplification the specification has a rule that if the last 10 minutes are below −2 sigma, the reaction plan requires the control to wait to turn on a load, until the grid condition improves above −2 sigma, or until the delay limit in the reaction plan is exceeded. The standard, or modified "Shewhart control chart rules" can be applied if more critical decisions are required. The rules have a ranking of severity from low, to high. Said decisions could be a more complex set of decisions such as aggressive load shedding, or to avoid energizing loads. Moderate reduction for medium shift indicators. Operate normally if the process measurement is in control. It is also possible to modify said rules, so that for above average positive sigma, loads could be run while not necessary, to store energy, following severity rankings. Each device will make its own decisions based on its original design, programming and operational tolerances. For example, a refrigerator can change its temperature set point within a narrow range, without effecting its operation. The ability to make ice could be deferred with no noticeable effect on the user. Pools and Spas also have set points and clean-up operations that can be changed within a narrow band but tolerate shift for a longer period of time.

The present invention can generate commands that conform to standards such as CTA-2045. See CTA-2045 standard which specifies said ranking commands: ANSI/CTA-2045 specifies a modular communications interface (MCI) to facilitate communications with residential devices for applications such as energy management. The MCI provides a standard interface for energy management signals and messages to reach devices. The present invention will conform to the MCI standard, but does not require said MCI, or any other form of external communication.

Figure 9:
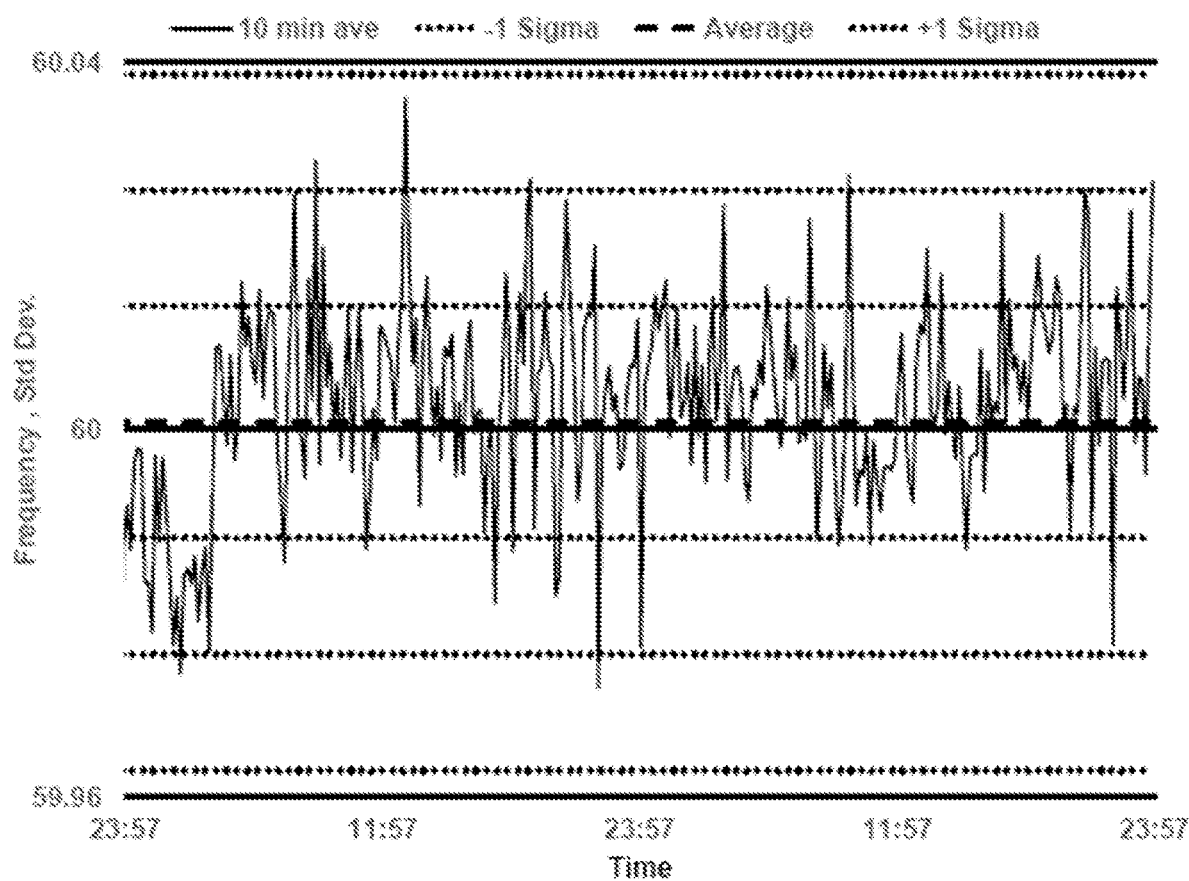
FIG. 9: Each datum point shows a bin over a 2-day period in summer in a control chart format. Dashed line is the long-term average. Dotted lines are the sigma levels and long-term standard deviations.

FIG. 9 shows a 2-minute sampling of the grid frequency, with an obvious sag at the beginning. A device attempting operation in this period could delay operation waiting for better conditions with a maximum time limit set for each device. For example, a pool can delay most functions for several hours, and a refrigerator might be able to delay 20 or 30 minutes without any negative effects. Well known control chart rules can be used to make more detailed decisions depending on the complexity and flexibility of the device.

Figure 3:
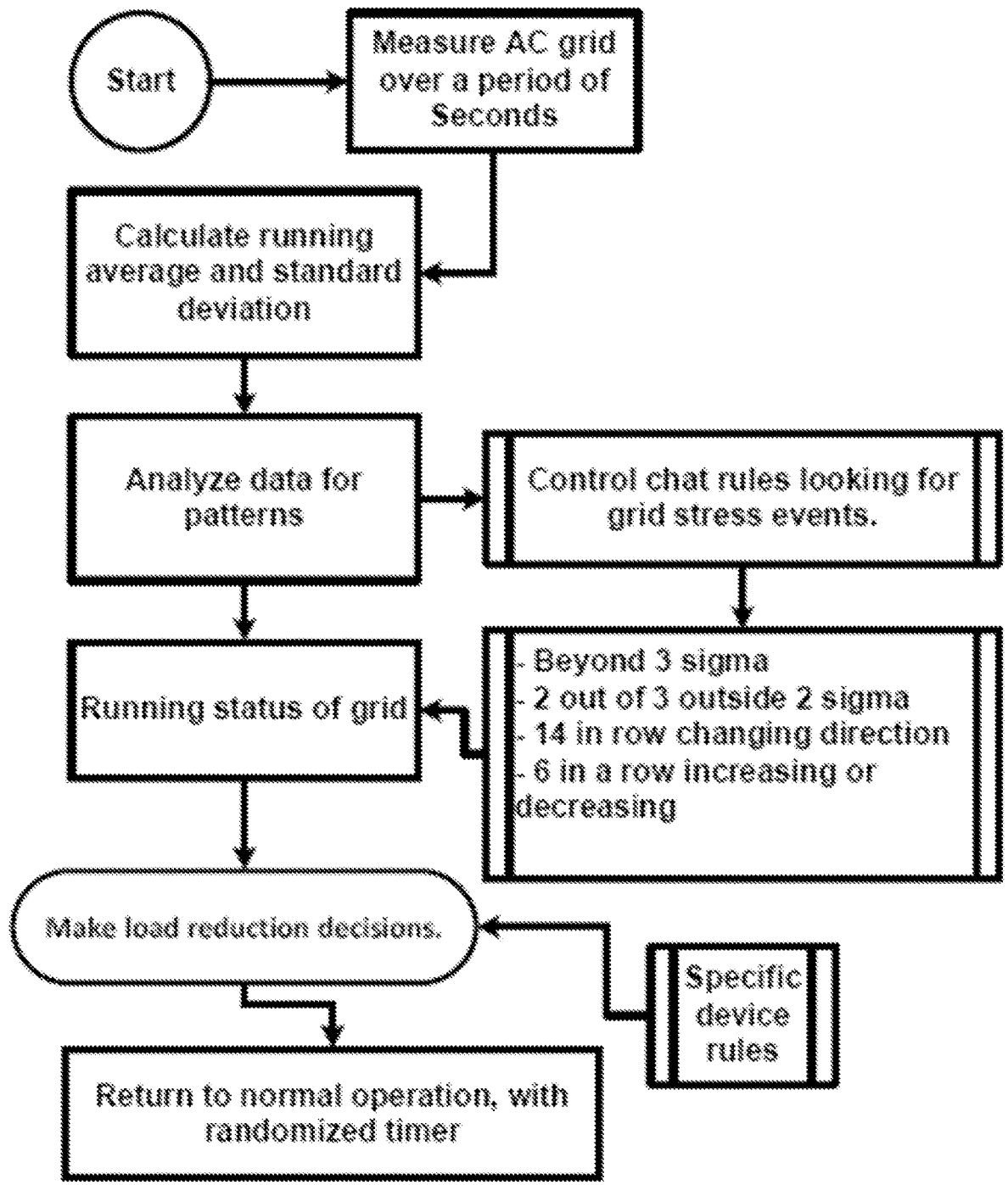
FIG. 3: Is a flow chart of short-term tracking looking of high grid stress events requiring quick response.
Figure 10:
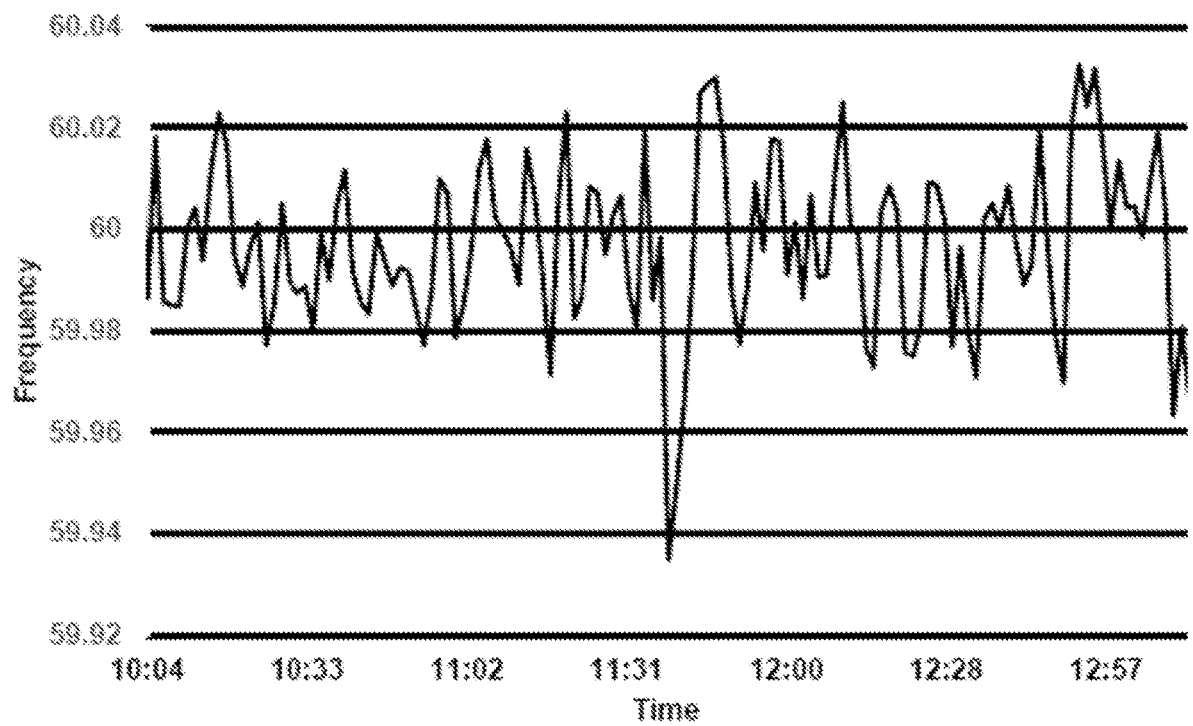
FIG. 10: Is an actual event with a large sudden drop in frequency at approximately 11:30.
Figure 11:
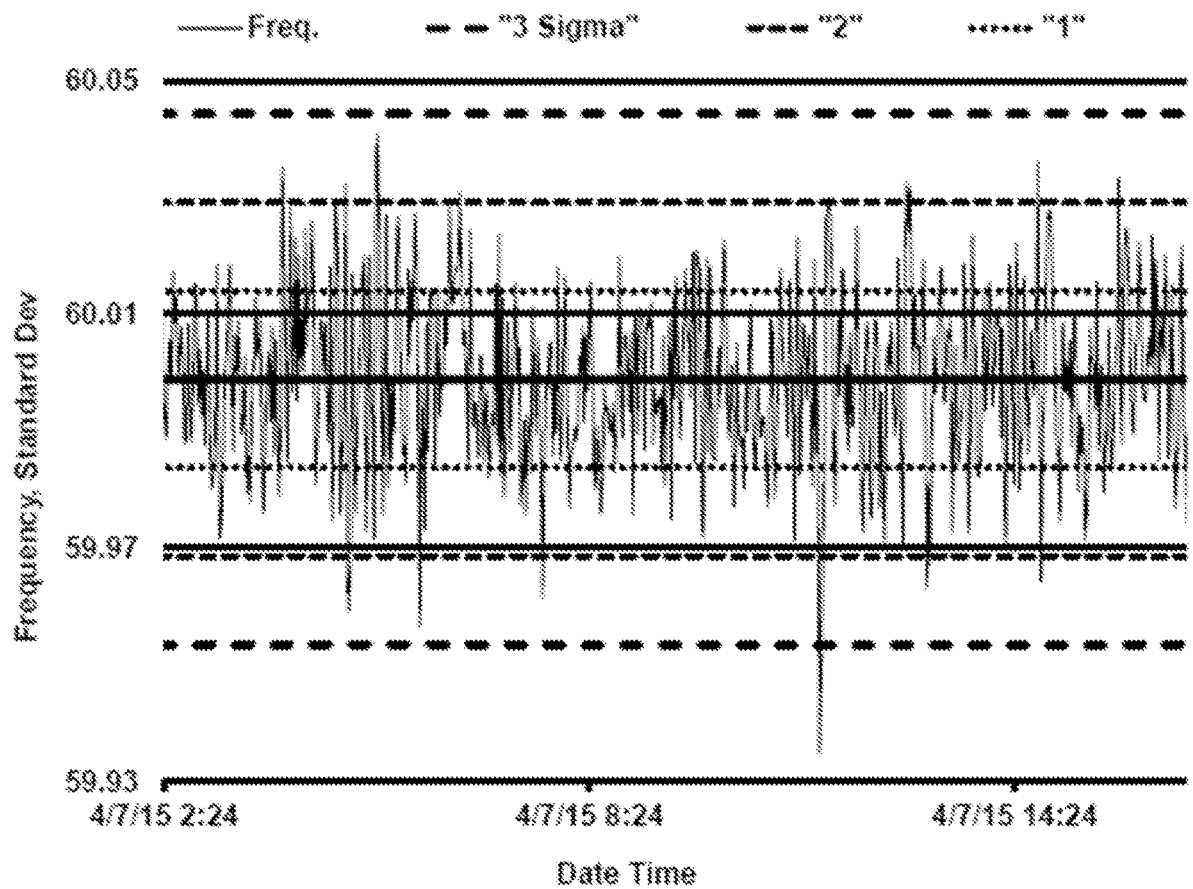
FIG. 11: Is same data as FIG. 10 in a control chart format. Solid line is overall average while dashed and dotted lines are standard deviations.
Figure 12:
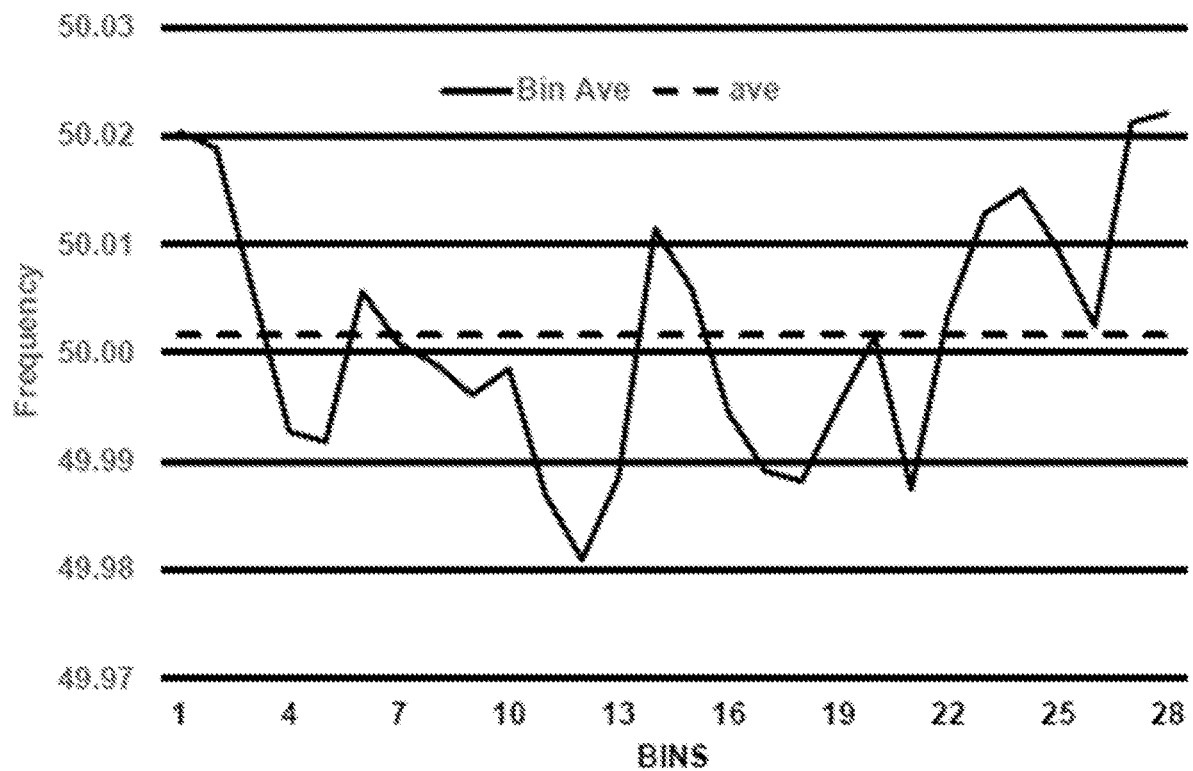
FIG. 12: Is bin data for UK over 12 days in summertime. Average is dashed line.

Typical control chart rule examples;
Any data point excursion beyond 3 sigma is considered out of control and immediate action is required.
8 data points below -1 sigma indicates grid stress.
4 out of 5 data points below -1 sigma are warnings of grid stress, defer loads if possible.
4 out of 5 data points above 1 sigma is an opportunity to increase loads.
The data point sampling can be done over a few minutes and would be simple to implement in smaller devices. For larger devices, or even complex smaller devices additional time frames can be added to monitor unexpected grid events such as detecting a generator dropping out anywhere on the grid. By sampling over a very short timeframe of a few seconds, larger events can be detected from any point on the grid, using the SPC control chart approach (see FIGS. 3, 10 and 11). FIG. 10 at 11:30 shows a generator dropping out hundreds of miles from the monitoring point. A simple device monitoring a short running average, for example 1 second, can detect unusually high grid stress events (below 3 sigma). More complex devices can be configured to detect the oscillations that typically precede a sudden drop in grid output (see FIG. 11). "Shewhart control chart rules" can be applied flag oscillations above and below 1 or 2 sigma. Standard control chart rules can be configured to detect precursors to other grid events and respond with action favorable to grid stability.

While these conditions are rare immediate load reduction could help protect the grid. The grid needs about 10 minutes to adjust so most devices have the capability to turn off for a short period of time without a noticeable reduction in performance.

Due to the autonomous, stand-alone nature of the present invention, there is no risk of a hacker commandeering many devices to destabilize the grid. Instead each device makes independent decisions with some variation in sensitivity. The present invention derives it instructions from the grids frequency and voltage, both of which are nearly impossible to hack. Even the frequency of a small local area would be difficult to change for even a second.

When a device, using the present invention, recovers from a grid event, there would be a random component to the resumption of normal operation. Over a period of several minutes some loads would gradually resume normal operation and other loads would resume operation only when needed, as dictated by the specific load rescheduling instructions of each device, which makes it unlikely that all loads would turn back on all at once after the resumption of power.

A combination of frequency and voltage are useful in larger complex devices where load, generation and transmission lines are a consideration. Frequency is favored for predictive scheduling and voltage is favored for real time decisions, but some decisions consider input from a combination of both. Control and warning levels are considered as generated from "Shewhart control chart rules" or other similar set of SPC decisions.

One Advantage of the present invention is that is adapts to the different grid conditions present in the three different US grids (East, West and Texas). The 3 sigma levels of the present invention are similar to the three alarm levels presently used in these three US grids even though the alarm levels vary slightly, from grid to grid, but will be generally proportional to the normal value of each grid. The present invention will operate effectively in any region without any setup or calibration.

Figure 13:
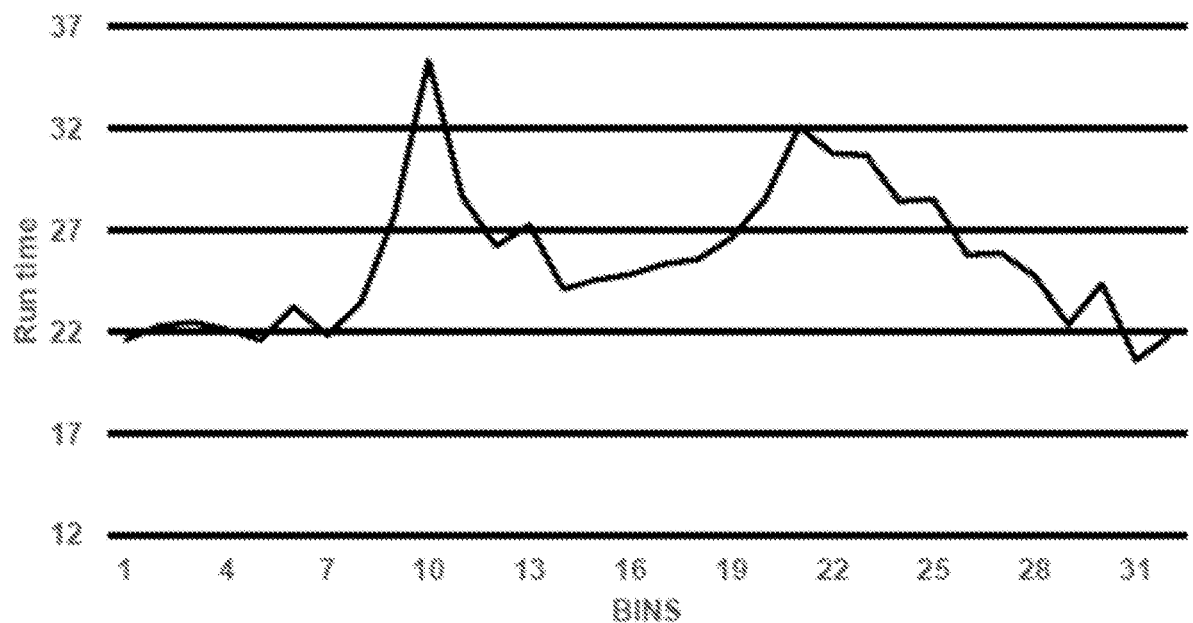
FIG. 13: is a device usage pattern for a typical home appliance showing a 30-day average of 45-minute bins over 24 hours.
Figure 14:
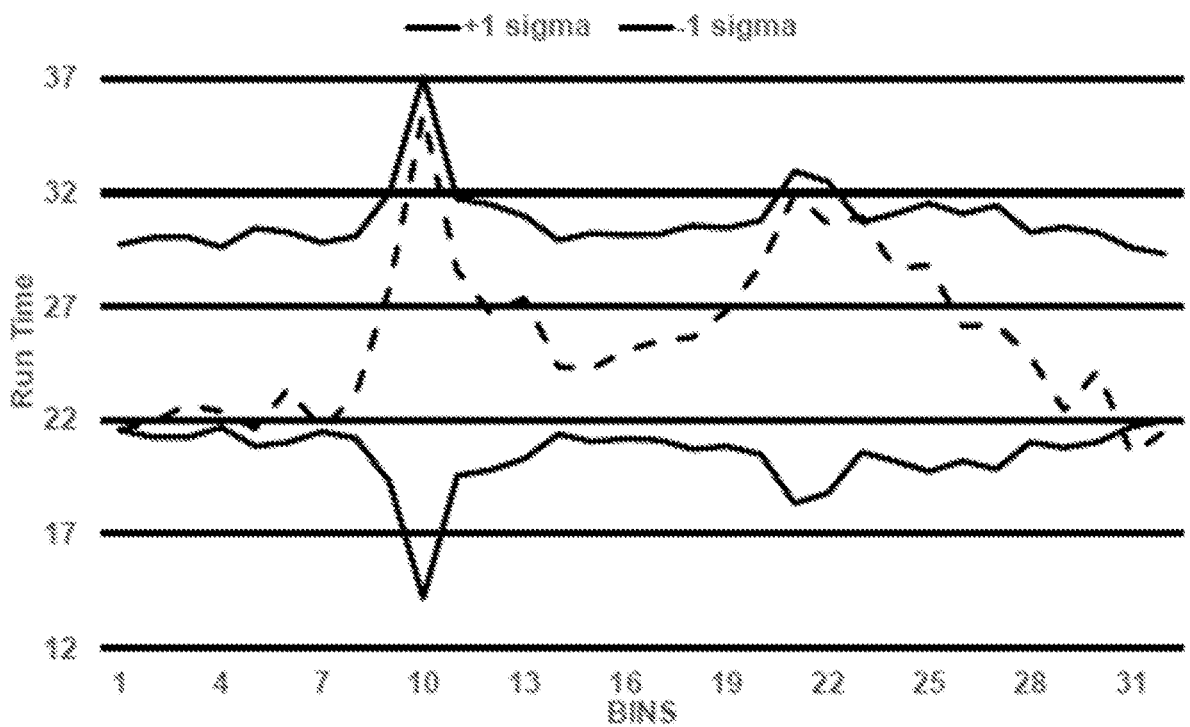
FIG. 14: Shows standard deviation data for the same bins as in FIG. 13.
Figure 15:
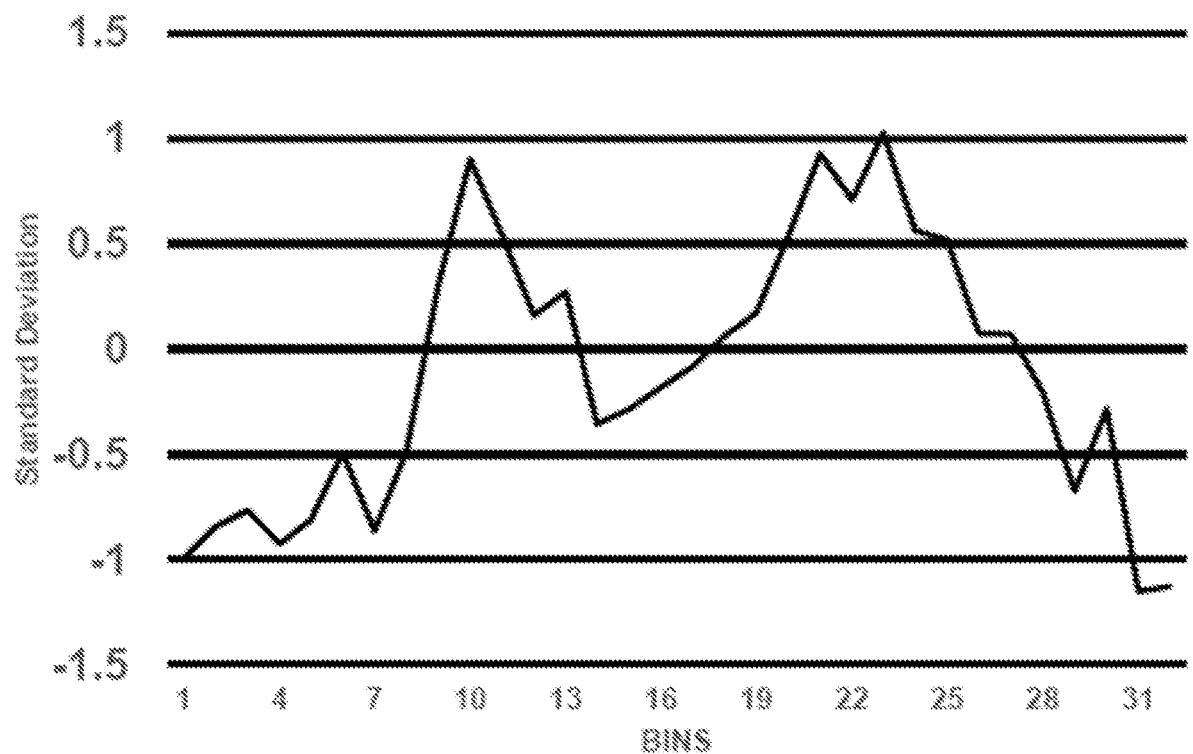
FIG. 15: Converts data from FIG. 14 to control chart format. Vertical scale standard deviations from each bin.

A devices typical usage pattern is an important consideration in determining optimum load scheduling. FIG. 13 is a device usage pattern, or load side pattern, for a typical home appliance, that shows a 3-day average over 24 hours for this example, the data starts at midnight. A similar pattern, as taught by Lacey in U.S. Pat. No. 9,032,751 of the running duty cycle pattern of a refrigerator. As in FIG. 7, the deviation is taken for each bin in FIG. 14. The chart shows a larger variation in data during the morning period. In this case, could be attributed to changing patterns due higher usage and differences between weekdays and weekends. FIG. 15 converts data into a control chart plotting usage deviation from full average and bin standard deviation, in the same way as FIG. 8. A high average deviation in a stable period is considered a higher usage event. In this example it would be best to run loads during the low use period and avoid the high deviation period of which the usage is uncertain. This differs from FIG. 8 since the negative usage pattern is inverted. The least desirable times are the inverse of the frequency, therefore would avoid scheduling defrost in the higher number periods.

Figure 18:
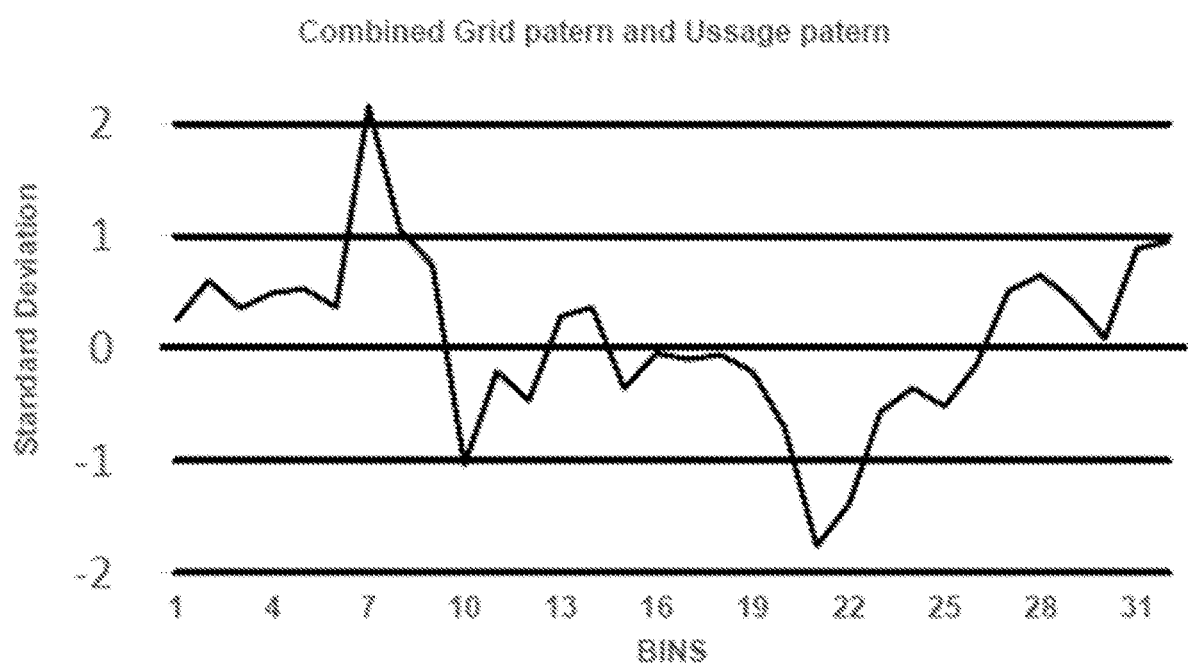
FIG. 18: combines AC grid control chart as in FIG. 8 and individual device usage patterns as in FIG. 15 (inverted) into a new control chart.
Figure 19:
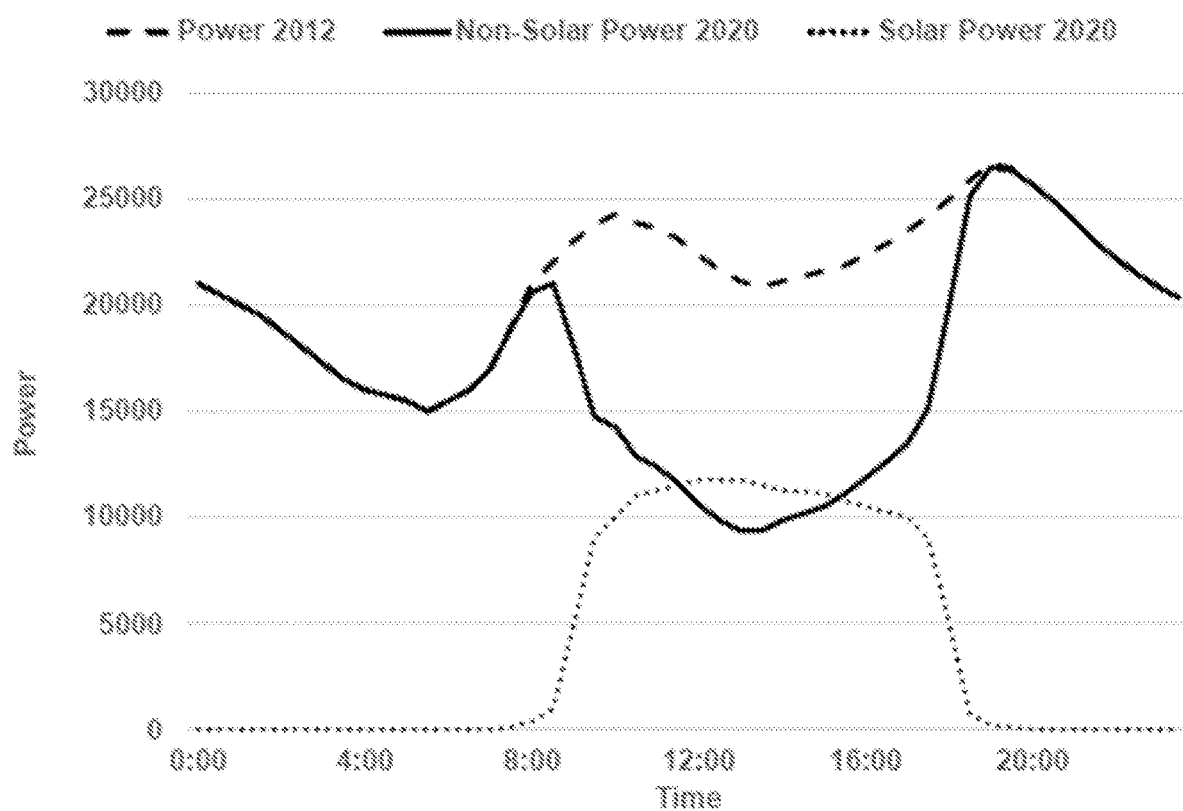
FIG. 19: The "Duck Curve" graph.

Consider both the AC grid control chart as in FIG. 8 and the load Control chart in FIG. 15 and combine the period standard deviation numbers to create a new control chart result as shown in FIG. 18 . Said new control chart data is used to make predictions based on grid history and stability, as well as the load usage pattern. In this case late morning and afternoon are less desirable than with AC grid alone. In this case we find current morning and afternoon peaks. As those condition change, we can follow them and use control chart to allow adaptive predictions of when to change operating parameters and schedule large loads.

This invention takes advantage of the average and deviation to be able to plot data against standard deviation and finding best and worst points for adjusting load and running high load like defrost and making Ice. This technique can be applied to any device with an expected daily, or periodic usage pattern. Converting frequency and load into standard deviation values allows us to accumulate differing values into a standard form and simplifying analysis. In the case of a refrigerator we might find the best period for grid could be worse case for load.

Figure 16:
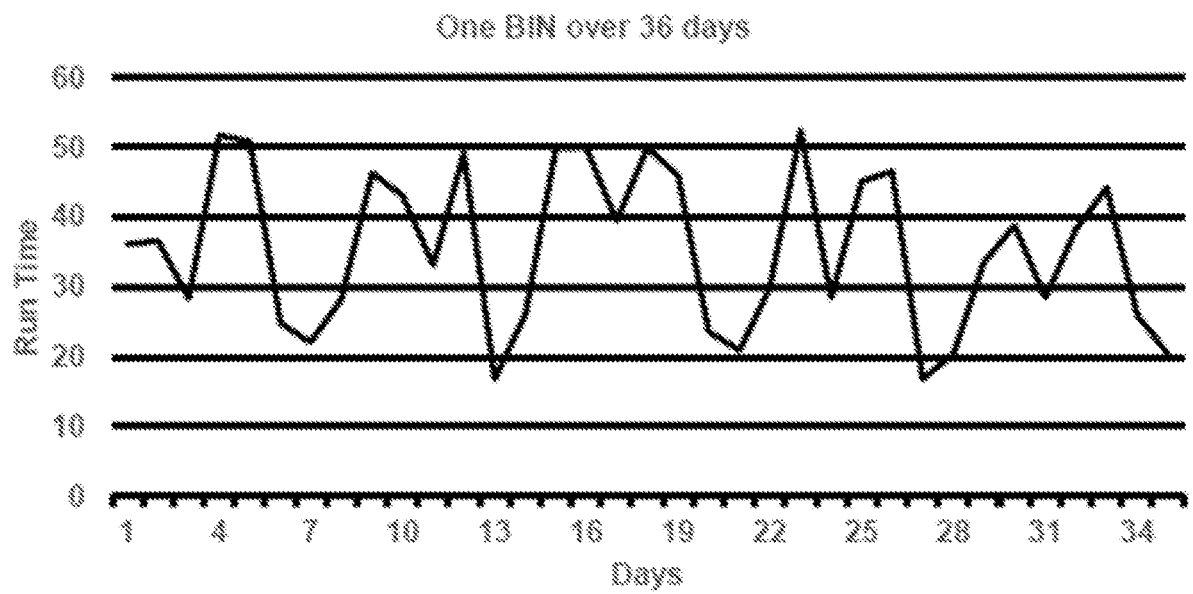
FIG. 16: data form FIG. 13 one bin over 30 days.
Figure 17:
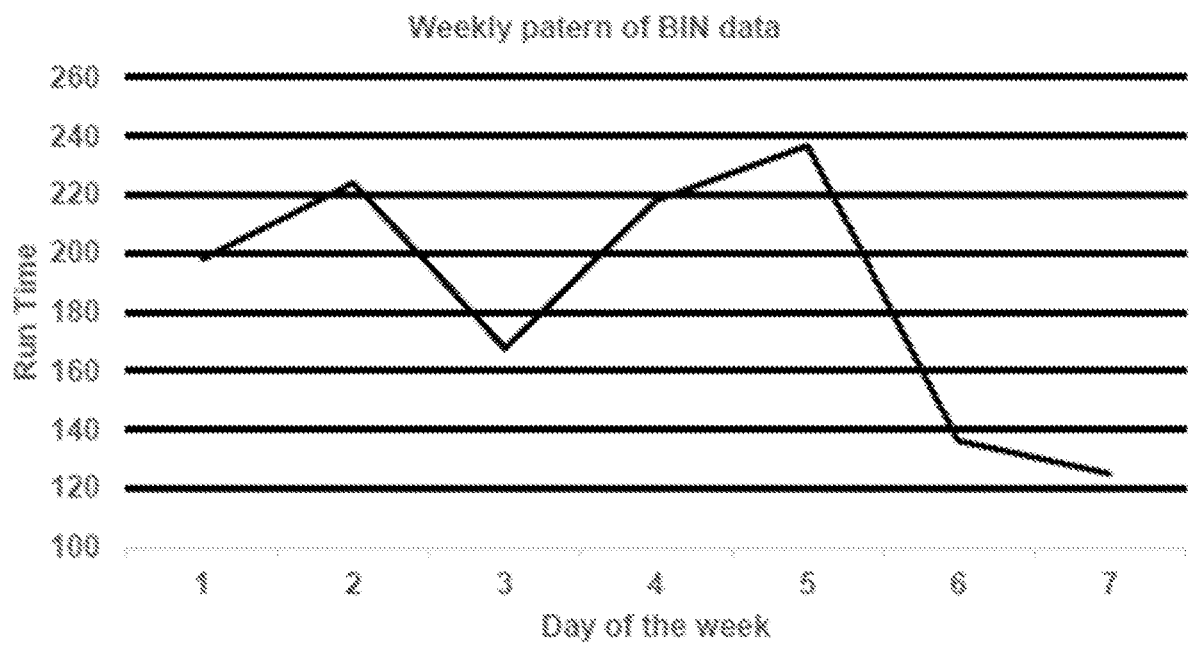
FIG. 17: Bin from FIG. 16 averaged in 7-day cycle, Monday to Sunday.

Other periodic usage patterns can be considered. Referring to FIGS. 16 and 17 a weekly pattern is evident, which could be used in some devices where a weekly pattern is expected and can be used to schedule or defer loads. Pools for example might have a higher weekend loading and we could schedule cleanup for just before and after weekend usage. FIG. 16 is a plot of the daily average of the bin with the highest standard deviation. In this case early morning is bin 10. A pattern can be easily seen in FIG. 17 where every $7^{th}$ day from bin 10 is averaged. To make data easier to see, day 1 is set to Monday. Bins 6 and 7 (weekend) have the lowest average in the case of a refrigerator. Other 7-day patterns are possible and might not coincide with the weekend. The algorithm looks for patterns, even if not synchronous with the weekdays, just looking for lower and higher usage patterns in a weekly cycle. One could go further and look for patterns other than 7 days that might emerge from, for example, first responder schedules, possibly 3-day cycles. Depending on how advantageous this information is to each device, determines how much processing power should be dedicated.

While the present invention can be considered independent of a devices control functions, it is better to consider each devices response using the information provided in the present invention, considering each devices' operating principles and boundaries to optimize responses.

Said techniques are scalable to each application allowing low additional complexity to individual devices. Some of today's light bulbs contain enough processing power to look at the real time grid status and made decisions to lower loads individually. Other devices that run continuously, such as refrigeration, can add tracking to make predictive decisions to change load behavior. Devices with even larger loads or more tolerance for change can run all said techniques to accomplish autonomous demand response such as pools and water heaters.

What is claimed is:

1. A demand side management method of continuously optimizing the stability of an alternating current grid which comprises the steps of:
   a. characterizing a status of the alternating current grid utilizing statistical process control techniques comprising:
      i. a first monitoring of the alternating current grid voltage and frequency;
      ii. logging at least one piece of data of the first monitoring;
      iii. analyzing said data of the first monitoring using statistical process control techniques;
      iv. utilizing said statistical process control techniques to determine the status of said first monitoring;
      v. utilizing said status determinations of said first monitoring to assist in current load operation decisions, wherein current load operation decisions affect a usage of at least one device attached to the alternating current grid;
      vi. saving said status determinations of said first monitoring;
   b. characterizing the status determinations of said first monitoring comprising:
      i. utilizing said status determinations, to forecast at least one future status of said alternating current grid;
      ii. utilizing said future status forecast to assist in scheduling future load operation decisions, wherein future load operation decisions affect a usage of at least one device attached to the alternating current grid;
      iii. comparing said future status forecasts of the grid status of the first monitoring, with a second monitoring of an actual grid status, at a forecasted time, and adjusting at least one forecast algorithm to optimize an accuracy of future projected characterizations;
   c. analyzing said status determinations of said first monitoring to assess deviation of size of each individual bin within a plurality of bins;
   d. using said deviations to look for a 7-day sequence;
   e. using the 7-day sequence to determine week days and weekend days;
   f. utilizing the week days and weekend days determinations to assist in current load operation decisions;
   g. utilizing said status determinations to assist in current generation operation decisions; and
   h. saving said status determinations of said first monitoring in 7-day sequences in the plurality of bins.

2. The method of claim 1 further comprising:
   a. utilizing said status determinations of said first monitoring to assist in current generation operation decisions, wherein current generation operation decisions are based on a usage of at least one device attached to the alternating current grid; and
   b. utilizing said future status forecast to assist in scheduling future generation decisions,
   wherein future generation operation decisions are based on a usage of at least one device attached to the alternating current grid.

3. The method in claim 1 further comprising:
   a. looking for a pattern indicative of any periodic number of days including 7 days.

4. The method of claim 1 further comprising:
   a. utilizing error checking and correction for line dropouts and grid interruptions comprising:
      i. utilizing a running average to fill in erroneous data;
      ii. utilizing a running clock to fill in erroneous data.

5. The method of claim 1 further comprising:
   a. the first monitoring of the alternating current grid monitoring an operation of the at least one device and a power consumption over time;
   b. logging at least one piece of data of the first monitoring;
   c. analyzing said data of the first monitoring using statistical process control techniques;
   d. utilizing said statistical process control techniques to determine the status of said first monitoring;
   e. utilizing said status determinations of said first monitoring to assist in current load operation decisions; and
   f. saving said status determinations of said first monitoring.

6. The method of claim 5 further comprising:
   a. characterizing the status of the alternating current grid utilizing statistical process control techniques to follow a grid condition as it changes over time.

7. The method of claim 6 further comprising:
   a. securing a connection between the at least one device and the alternating current grid, wherein an exact location of the at least one device cannot be determined.

8. The method of claim 6 further comprising:
   a. securing a connection between the at least one device and the alternating current grid,
   wherein the at least one piece of data regarding the at least one device is secured.

9. The method of claim 1 further comprising:
   a. the at least one device being configured to shut down its operation.

* * * * *